B. FORD.
STORAGE BATTERY.
APPLICATION FILED APR. 24, 1916.

1,230,394.

Patented June 19, 1917.
2 SHEETS—SHEET 1.

WITNESS:

INVENTOR
Bruce Ford
BY
ATTORNEY

B. FORD.
STORAGE BATTERY.
APPLICATION FILED APR. 24, 1916.
1,230,394.
Patented June 19, 1917.
2 SHEETS—SHEET 2.
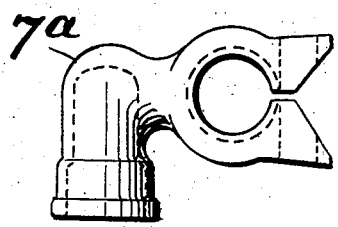
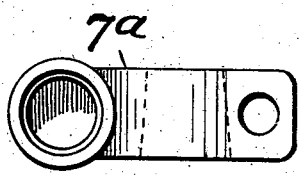
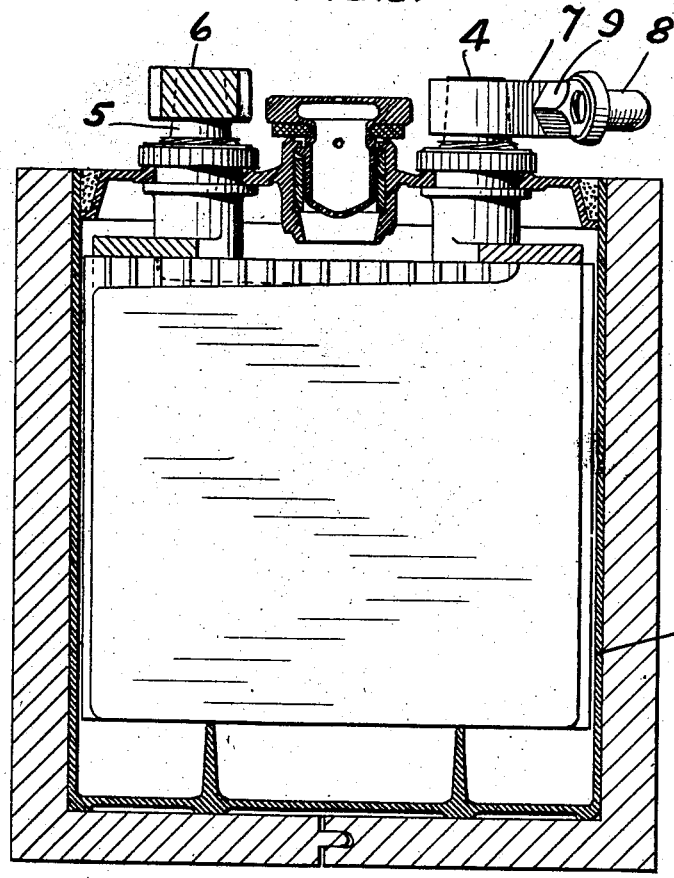
INVENTOR
Bruce Ford
BY
ATTORNEY.

UNITED STATES PATENT OFFICE.

BRUCE FORD, OF PHILADELPHIA, PENNSYLVANIA.

STORAGE BATTERY.

1,230,394.   Specification of Letters Patent.   Patented June 19, 1917.

Application filed April 24, 1916. Serial No. 93,088.

*To all whom it may concern:*

Be it known that I, BRUCE FORD, a citizen of the United States, and a resident of Philadelphia, in the county of Philadelphia and State of Pennsylvania, have invented certain new and useful Improvements in Storage Batteries, of which the following is a specification.

The principal objects of the present invention are to simplify and cheapen the construction of storage batteries of the general type that are frequently used in vehicles, and to provide storage batteries which are adapted for universal use in vehicles and the like.

Other objects of the invention will appear from the following description, in which reference will be made to the accompanying drawings, forming part hereof, and in which—

Fig. 3, is a transverse sectional view of the same, and

Fig. 4 a plan, and Fig. 5, an edge view illustrating a modification.

Figure 1:
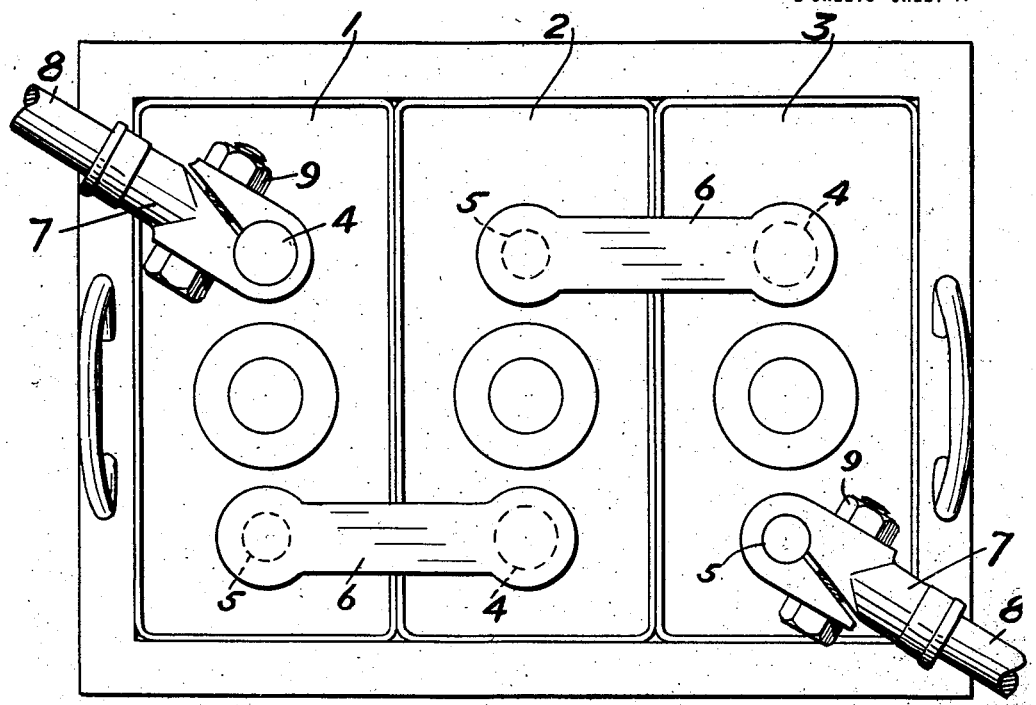
Figure 1, is a top or plan view of a storage battery embodying features of the invention.
Figure 2:
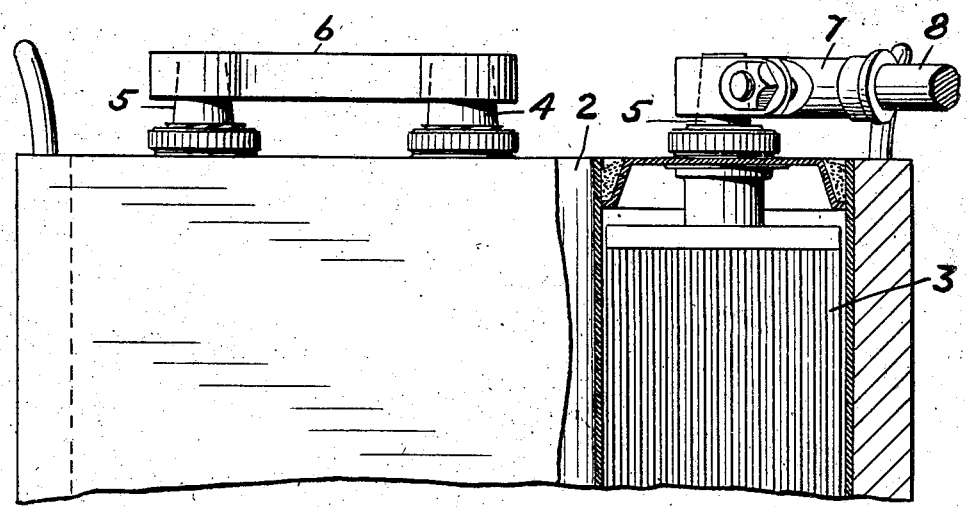
Fig. 2, is a side view of the same with parts broken away.

Referring to the drawings a storage battery of the present invention consists of a plurality of cells 1, 2, and 3, three cells are shown in the present instance but the number can be increased. The positive terminal posts 4 of all the cells are alike in size and form and the negative terminal posts 5 of all the cells are alike in size and form but may differ in size and form from the positive terminal posts. The terminal posts of all the cells are cylindrical and preferably slightly tapering, but the negative terminal posts are of different diameter than the positive terminal posts. Inter-cell connectors 6 are integrally burned to the posts which they connect. One way of accomplishing this is to drive the terminal posts into suitable holes in the connectors and to then puddle and melt lead or lead alloy so as to make an integral connection. By properly proportioning the terminal posts and openings in the connectors for their reception it is made easy to connect up the cells in proper manner. 7 are line connections for the end cell terminal posts. They are connected with the line wires or conductors 8 and are detachably connected to the posts. As shown they encircle the post and are capable of being placed in any required angular relation and are fastened and unfastened by bolts and nuts 9. These line connections may be straight, as shown in Fig. 1, or they may be made angular like the line connection 8ª in Figs. 4 and 5, according as the lines 8 may be lead in in one direction or another.

It is evident that each cell is a duplicate of the other, so far as the terminal posts are concerned, and this is a matter of importance in convenience both of manufacture and assemblage. Again the provision of the integrally burned inter-cell connectors 6 insures a certain and positive connection, is inexpensive and avoids corrosive effects. The provision of the detachable line connections makes the battery readily applicable for installation in connection with practically any system of vehicle wiring and so the battery is universal in its application to vehicles and like structures of all makes.

What I claim is:

1. A storage battery consisting of a plurality of cells having terminal posts, the posts of like polarity of end and intermediate cells being alike, intermediate connectors integrally burned at each end to posts of different cells, and line connectors detachably clamped to one terminal post of each end cell.

2. A storage battery equipment consisting of a unitary structure comprising a plurality of cells having intercell connections burned at each end to the posts of cells and having end cell terminals consisting of posts, in combination with connectors forming part of lines and adapted to be detachably clamped to the posts of end cells in different radial positions, substantially as described.

BRUCE FORD.